United States Patent
Kim et al.

(10) Patent No.: US 11,597,182 B2
(45) Date of Patent: Mar. 7, 2023

(54) LAMINATING FILM AND LIGHT-TRANSMITTING LAMINATE INCLUDING SAME

(71) Applicant: SKC Co., Ltd., Suwon-si (KR)

(72) Inventors: Hyejin Kim, Suwon-si (KR); Jaechul Han, Ulsan (KR)

(73) Assignee: SKC CO., LTD., Suwon-si (KR)

(*) Notice: Subject to any disclaimer, the term of this patent is extended or adjusted under 35 U.S.C. 154(b) by 0 days.

(21) Appl. No.: 17/573,889

(22) Filed: Jan. 12, 2022

(65) Prior Publication Data

US 2022/0134705 A1 May 5, 2022

Related U.S. Application Data

(63) Continuation of application No. PCT/KR2020/008175, filed on Jun. 23, 2020.

(30) Foreign Application Priority Data

Jul. 23, 2019 (KR) .................. 10-2019-0088950

(51) Int. Cl.
| | |
|---|---|
| *B32B 7/00* | (2019.01) |
| *B29C 45/00* | (2006.01) |
| *B32B 7/023* | (2019.01) |
| *B29C 45/16* | (2006.01) |
| *B32B 7/12* | (2006.01) |
| *B29C 33/04* | (2006.01) |
| *B32B 17/10* | (2006.01) |

(52) U.S. Cl.
CPC .............. *B32B 7/023* (2019.01); *B29C 45/16* (2013.01); *B32B 7/12* (2013.01); *B29C 33/04* (2013.01); *B32B 17/10559* (2013.01); *B32B 2605/006* (2013.01)

(58) Field of Classification Search
CPC .. B32B 7/00; B32B 7/02; B32B 7/023; B32B 7/10; B32B 7/12; B29C 45/00; B29C 45/10; B29C 45/16
See application file for complete search history.

(56) References Cited

FOREIGN PATENT DOCUMENTS

| | | | |
|---|---|---|---|
| JP | 2017-217773 A | | 12/2017 |
| JP | 2017217773 | * | 12/2017 |
| JP | WO 2019/004289 A1 | | 1/2019 |
| JP | 2019-81381 A | | 5/2019 |
| JP | 2019081381 | * | 5/2019 |
| KR | 10-2012-0076184 A | | 7/2012 |
| KR | 10-1425242 B1 | | 8/2014 |
| KR | 10-2018-0063174 A | | 6/2018 |
| KR | 10-1986765 B1 | | 6/2019 |
| KR | 10-2237613 B1 | | 4/2021 |

OTHER PUBLICATIONS

International Search Report dated Jan. 12, 2021, in counterpart International Application No. PCT/KR2020/008175 (2 pages in English and 3 pages in Korean).
Written Opinion dated Jan. 12, 2021, in counterpart International Application No. PCT/KR2020/008175 (3 pages in Korean).

* cited by examiner

*Primary Examiner* — Jacob T Minskey
*Assistant Examiner* — Matthew Hoover
(74) *Attorney, Agent, or Firm* — NSIP Law

(57) ABSTRACT

The present disclosure relates to a film for bonding including an embossed surface, wherein the embossed surface has a Sku value of 5 or less, wherein the embossed surface has Sk, Spk, and Svk values, and when a total sum of the Sk value, the Spk value, and the Svk value is 100%, a sum of the Sk value and the Spk value is 50% or more, wherein the embossed surface has a Sz value of 30 to 90 μm, and wherein the film includes a polyvinyl acetal resin and a plasticizer.

19 Claims, 4 Drawing Sheets

LAMINATING FILM AND LIGHT-TRANSMITTING LAMINATE INCLUDING SAME

CROSS-REFERENCE TO RELATED APPLICATIONS

Pursuant to 35 USC 120 and 365(c), this application is a continuation of International Application No. PCT/KR2020/008175 filed on Jun. 23, 2020, and claims the benefit under 35 USC 119(a) of Korean Application No. 10-2019-0088950 filed on Jul. 23, 2019, in the Korean Intellectual Property Office, the entire disclosures of which are incorporated herein by reference for all purposes.

BACKGROUND

1. Field

The present disclosure relates to a film for bonding and a light transmitting laminate including the same.

2. Description of the Background

Polyvinyl acetal is used as an interlayer (film for laminated glass) of a laminated glass (safety glass) or a light transmitting laminate. Laminated glass is mainly used in windows of architecture, cladding, and window glass of automobiles, and due to characteristics, such as anti-scattering of glass fragments when broken and penetration resistance against impact of a certain strength, it can secure stability for minimizing damage or injury given to objects or people located in the inside thereof.

A film for bonding has plural minute embossed dots formed in the surface to prevent blocking among interlayers, to improve a workability of overlapping an interlayer on a glass plate (sliding property on a glass plate as handling workability), and a deairing property of a film when processed to be laminated with a glass plate.

When an embossed film for bonding is used in lamination, there is a possibility of generating an interference pattern or a bubble due to the embossed dots disposed on both surfaces of the film, and visibility may decrease. Also, there is a problem of workability when a dazzle occurs.

SUMMARY

In one general aspect, the film for bonding includes an embossed surface, wherein the embossed surface has a Sku value of 5 or less, wherein the embossed surface has Sk, Spk, and Svk values, and when a total sum of the Sk value, the Spk value, and the Svk value is 100%, a sum of the Sk value and the Spk value is 50% or more, wherein the embossed surface has a Sz value of 30 to 90 μm, and wherein the film includes a polyvinyl acetal resin and a plasticizer.

The Sk value may be 5 to 40 μm.
The Sk value may be 10 to 35 μm.
The Sku value may be less than 4.
The Spk value may be 2 to 25 μm.
The film may be a single layered film.
The film may be a laminated film with two or more layers.
The embossed surface may have a transferring ratio of 0.70 or more.
A section of the film may include a wedge shape in at least a portion of the section.

In another general aspect, the light transmitting laminate includes: a first light transmitting layer; a film for bonding disposed on one surface of the first light transmitting layer; and a second light transmitting layer disposed on the film for bonding, wherein the film for bonding includes an embossed surface, wherein the embossed surface has a Sku value of 5 or less, wherein the embossed surface has Sk, Spk, and Svk values, and when a total sum of the Sk value, the Spk value, and the Svk value is 100%, a sum of the Sk value and the Spk value is 50% or more, wherein the embossed surface has a Sz value of 30 to 90 μm, and wherein the film comprises a polyvinyl acetal resin and a plasticizer.

The Sk value may be 5 to 40 μm.
The Sk value may be 10 to 35 μm.
The Sku value may be less than 4.
The Spk value may be 2 to 25 μm.
The film may be a single layered film.
The film may be a laminated film with two or more layers.
The embossed surface may have a transferring ratio of 0.70 or more.
A section of the film may include a wedge shape in at least a portion of the section.

In still another general aspect, the vehicle includes a light transmitting laminate including: a first light transmitting layer; a film for bonding disposed on one surface of the first light transmitting layer; and a second light transmitting layer disposed on the film for bonding, wherein the film for bonding includes an embossed surface, wherein the embossed surface has a Sku value of 5 or less, wherein the embossed surface has Sk, Spk, and Svk values, and when a total sum of the Sk value, the Spk value, and the Svk value is 100%, a sum of the Sk value and the Spk value is 50% or more, wherein the embossed surface has a Sz value of 30 to 90 μm, and wherein the film comprises a polyvinyl acetal resin and a plasticizer a film for bonding according to one embodiment includes an embossed surface, and the embossed surface has a Sku value of 5 or less.

Other features and aspects will be apparent from the following detailed description and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
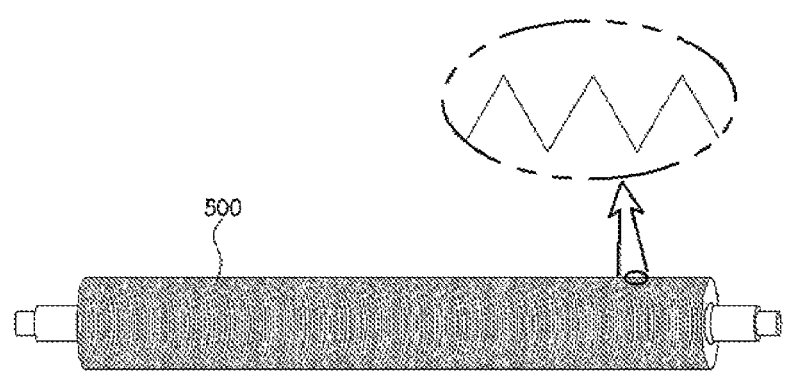
FIG. 1 is a conceptual view for illustrating an embossing roller used in a manufacturing process of the film for bonding of Comparative Example.

Hereinafter, example embodiments of the present disclosure will be described in detail with reference to the accompanying drawings so that they can be easily practiced by those skilled in the art to which the present invention pertains. However, the example embodiments may be embodied in many different forms and is not to be construed as being limited to the embodiments set forth herein. Like reference numerals designate like elements throughout the specification.

In this disclosure, terms for degree like "about", "substantially" and so on are used for meaning values approximative from/to the value when a tolerance to be proper to referred meaning for manufacture and substance is presented. Additionally, these terms for degree are used to help understand example embodiments and to prevent the presented content in which exact or absolute number is referred from being unjustly used by unconscionable trespassers.

Throughout this disclosure, the phrase "combination(s) thereof" included in a Markush-type expression denotes one or more mixtures or combinations selected from the group consisting of components stated in the Markush-type expression, that is, denotes those one or more components selected from the group consisting of the components are included.

Throughout this disclosure, the description of "A and/or B" means "A or B, or A and B."

Throughout this disclosure, terms such as "first," "second," "A," or "B" are used to distinguish the same terms from each other. Also, a singular form is interpreted as including a plural form unless contextually stated otherwise to be obvious.

In this disclosure "~" based may mean a compound corresponding to "~" or a derivative of "~" is being included inside a compound.

In this disclosure, "B being placed on A" means that B is placed in direct contact with A or placed over A with another layer or structure interposed therebetween and thus should not be interpreted as being limited to B being placed in direct contact with A.

In this disclosure, "connected to B on A" means that A and B are directly connected of connected through other components between A and B, and thus should not be interpreted as being limited to A and B being connected directly.

In this disclosure, a singular form is contextually interpreted as including a plural form as well as a singular form unless specially stated otherwise.

In this disclosure, a size of each component of a drawing can be exaggerated and different from a size to be actually applied.

In this disclosure, an amount of a hydroxyl group was evaluated by measuring an amount of an ethylene group with a hydroxyl group in the polyvinyl acetal resin in accordance with JIS K6728.

Films for bonding have a surface embossing characteristics such as regular protruding patterns or melt fractures on surfaces thereof to prevent unnecessary contact between the surfaces when they are winded, and to achieve a deairing performance when laminated with a light transmitting layer such as glass. However, when a film is manufactured in consideration of the deairing property only, optical properties of the film may be degraded, or an edge sealing characteristic may be deficient. Also, when a film is manufactured considering only the edge sealing characteristic, optical properties of the film may be degraded due to a problem such as bubble occurrence.

The inventors have conducted research on surface embossments of a film for bonding, which have excellent optical properties and sufficient edge sealing characteristic, while do not generate bubbles or the like when a light transmitting laminate such as laminated glass is formed. As a result, the inventors have confirmed that these characteristics can be satisfied by controlling characteristics of a surface, where embossments are formed.

Hereinafter, example embodiments will be described in further detail.

An objective of example embodiments is to provide a film for bonding improved in degassing stability, an edge sealing characteristic, and the like thereof, and a light transmitting laminate including the same.

In one general aspect, a film for bonding according to one embodiment in the present disclosure includes an embossed surface, and the embossed surface has a Sku value of 5 or less.

Sku value is a value evaluated according to ISO_25178, and is an index for evaluating a kurtosis (quotient of the mean quartic value of the ordinate values and the fourth power of Sq) in a certain area. The Sku value may be calculated by below Equation 1:

$$S_{ku} = \frac{1}{S_q^4}\left[\frac{1}{A}\int\int_A z^4(x, y)dxdy\right] \quad \text{[Equation 1]}$$

In the Equation 1, A is an area of a measuring target, z (x, y) refers to a height (z) value in x axis and y axis of coordinates within the area of the measuring target, and Sq refers to root mean square height of the surface.

The Sku value may be measured and then calculated by using a three-dimensional roughness measuring device.

The measurement of the 3D roughness may be evaluated by an average value of values measured in a total area of 1,000,000 µm² or more. In detail, when measured by using a three-dimensional optical profiler or a 3D laser measuring microscope, the 3D roughness may be measured five times or more in different positions in an area of 340,000 µm² or more, respectively, and an average of the values except for the maximum value and the minimum value may be used as a measuring value of three-dimensional roughness. When using a 3D laser measuring microscope, a 3D roughness may be measured by attaching neighboring images to be joined using a STICHING function, and the measurement using such a STICHING function may also be evaluated by an average of values measured in a total area of 1,000,000 µm² or more.

For example, Contour GT model as a 3D Optical Microscopy available from BRUKER may be used, and a 3D roughness may be obtained by measuring in VSI (Vertical scanning Interferometry) mode (same as below).

When a Sku value of the embossed surface of the film for bonding is more than 5, the height distribution of the embossed surface is excessively sharp and an edge sealing characteristic may be deficient.

A Sku value of the embossed surface may be 4 or less, or 3.5 or less. Also, a Sku value of the embossed surface may be 1.5 or more. A film for bonding having such a surface embossing characteristic may have height distribution of surface suitable for satisfying both of an edge sealing characteristic and a deairing characteristic properly.

A Sk value of the embossed surface may be 5 to 40 µm, or 10 to 35 µm. A film for bonding having such a surface embossing characteristic of such a Sk (distance between the highest and lowest level of the core surface) value may have distribution of a core portion suitable for satisfying both of an edge sealing characteristic and a deairing characteristic within height distribution of surface embossments.

The Sk value is a value evaluated according to ISO_25178, and the measured and calculated value may be taken by using a three-dimensional roughness measuring device. The detailed measuring method of 3D roughness is the same as the method described above.

A Sz value of the embossed surface may be 30 to 90 μm, 40 to 80 μm, or 50 to 75 μm. A film for bonding having such a surface embossing characteristic may have a height distribution of surface embossments to have sufficient deairing characteristic.

The Sz (maximum height) value refers to a sum of a maximum peak height value and a maximum pit depth value and means a height difference value of a peak and a pit. The Sz value is a value evaluated according to ISO_25178, and a measured and calculated value may be taken by using a three-dimensional roughness measuring device. The detailed measuring method of 3D roughness is the same as the method described above.

A Spk value of the embossed surface may be 2 to 25 μm, or 8 to 17 μm. The Spk (average height of the protruding peaks above the core surface) value means an average height of peaks higher than a core region and shows a peak characteristic of the embossed surface with the above Sku value. A film for bonding including surface embossments having the above Spk value is suitable for satisfying both of deairing performance and an edge sealing characteristic.

The Spk value is a value evaluated according to ISO_25178, and the measured and calculated value may be taken by using a three-dimensional roughness measuring device. The detailed measuring method of 3D roughness is the same as the method described above.

A Svk value of the embossed surface may be 1 to 30 μm, or 2 to 22 μm. A film for bonding having such a surface embossing characteristic of such a Svk (average height of the protruding dales below the core surface) value may have height distribution of a pit portion, which has a lower height than a core portion, satisfying both of an edge sealing characteristic and a deairing characteristic.

The Svk value is a value evaluated according to ISO_25178, and the measured and calculated value may be taken by using a three-dimensional roughness measuring device. The detailed measuring method of 3D roughness is the same as the method described above.

When the Sk value, Spk value, and Svk value of the embossed surface are controlled to a proper numerical value ratio, the film for bonding may have excellent deairing performance and an edge sealing characteristic. The embossed surface may be evaluated by an evaluation index (Vs, %) denoted by below Equation 2:

$$Vs = \frac{Sk + Spk}{Sk + Spk + Svk} \times 100 \quad \text{[Equation 2]}$$

In the Equation 2, Sk (μm), Spk (μm), and Svk (μm) values are respectively the same as defined above.

The embossed surface may have an evaluation index Vs of 50% or more, or 55% or more. Also, the embossed surface may have an evaluation value Vs of 90% or less, 85% or less, or 80% or less. When the Vs value is less than 50%, deairing stability of a film for bonding may be deficient.

That is, the sum of a Spk value and a Sk value of the embossed surface may be 50% or more, or 55% or more, when the total sum of a Sk value, a Spk value, and a Svk value is designated as 100%. When having such a numerical value ratio, the film can simultaneously have excellent deairing performance and an edge sealing characteristic.

The film for bonding may have the surface embossments in one surface, or may have the surface embossments on both surfaces including the one surface and the other surface opposite the one surface.

The film for bonding may be a single layer film.

The film for bonding may be a multilayer film.

The film for bonding may be a single layer film, and may include a polyvinyl acetal resin, or may include a polyvinyl acetal resin and a plasticizer.

Specifically, the film for bonding may include a polyvinyl acetal resin in an amount of 60 to 76 wt %, 70 to 76 wt %, or 71 to 74 wt %. When including the polyvinyl acetal resin in such a range, a film for bonding may achieve relatively high tensile strength and modulus.

The polyvinyl acetal resin may have an acetyl group in an amount of less than 2 wt %, and specifically, in an amount of 0.01 or more and less than 1.5 wt %. A polyvinyl acetal resin included in the first layer 10 may have a hydroxyl group in an amount of 15 wt % or more, 16 wt % or more, or 19 wt % or more. Also, a polyvinyl acetal resin included in the first layer may have a hydroxyl group in an amount of 30 wt % or less.

When a polyvinyl acetal resin having such a characteristic is used in the film for bonding, the film can excellently bond to a material such as glass and can have mechanical properties such as proper penetration resistance.

The polyvinyl acetal resin may be a polyvinyl acetal resin obtained by acetalization of a polyvinyl alcohol having a polymerization degree of 1,600 to 3,000 with aldehyde, or may be a polyvinyl acetal resin obtained by acetalization of a polyvinyl alcohol having a polymerization degree of 1,700 to 2,500 with aldehyde. When such a polyvinyl acetal is used, mechanical properties like penetration resistance of the film can be sufficiently improved.

The first polyvinyl acetal resin may be synthesized from polyvinyl alcohol and aldehyde, and the aldehyde is not limited in the type. Specifically, the aldehyde may be selected from the group consisting of n-butyl aldehyde, isobutyl aldehyde, n-valer aldehyde, 2-ethyl butyl aldehyde, n-hexyl aldehyde, and blend resins thereof. When n-butyl aldehyde is used as the aldehyde, the produced polyvinyl acetal resin may have a refractive characteristic with a small difference in refractive index of glass, and a characteristic in excellent adhesion with glass and the like.

The film for bonding may include the plasticizer in an amount of 24 to 40 wt %, 24 to 30 wt %, or 26 to 29 wt %. The film including the plasticizer in such a range is preferable in that the laminated film for bonding can achieve a proper adhesive strength and impact resistance.

Specifically, the plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and mixtures thereof. Specifically, any one selected from the group consisting of triethylene glycol di-2-ethyl butyrate, triethylene glycol di-2-ethylhexanoate, triethylene glycol di-n-heptanoate, and compositions thereof may be included as the first plasticizer, and further specifically, triethylene glycol bis 2-ethylhexanoate (3G8) may be used.

The film for bonding may further include an additive as needed, and for example, the additive may be selected from the group consisting of an antioxidant, a heat stabilizer, a UV absorber, a UV stabilizer, an IR absorber, a glass adhesion regulator, and combinations thereof.

As the antioxidant, a hindered amine-based antioxidant or a hindered phenol-based antioxidant may be used. Specifically, on the process of manufacturing polyvinyl butyral (PVB) which needs a processing temperature of 150° C. or higher, a hindered phenol-based antioxidant is further preferable. The hindered phenol-based antioxidant may be for example, IRGANOX 1976, 1010, or so on available from BASF SE.

As the heat stabilizer, a phosphite-based heat stabilizer may be used considering suitability with an antioxidant. For example, the heat stabilizer may be IRGAFOS 168 available from BASF SE.

As the UV absorber, Chemisorb 12, Chemisorb 79, Chemisorb 74, or Chemisorb 102 available from CHEMIPRO KASEI KAISHA, LTD may be used, or Tinuvin 328, Tinuvin 329, or Tinuvin 326 available from BASF SE may be used. As the UV stabilizer, Tinuvin available from BASF SE may be used. As the IR absorber, ITO, ATO, or AZO may be used, and as the glass adhesion regulator, a metal salt such as magnesium (Mg), potassium (K), sodium (Na), epoxy-based modified silicon (Si) oil, or a mixture thereof may be used, but the present disclosure is not limited thereto.

The film for bonding is a multilayer film and may be a laminate with two or more layers. The film may be a laminate with three or more layers, or a laminate with five or more layers. The multilayer film may include a skin layer in direct contact with a light transmitting laminate such as a glass plate and a core layer distinct from the skin layer. The core layer may have functionality, and for example, may have functionality such as sound insulating functionality, heat insulating functionality, and the like.

The multilayer film may have at least one layer including a polyvinyl acetal resin composition corresponding to the composition of the single layer described above. The multilayer film may include a polyvinyl acetal resin and a plasticizer. Descriptions of the polyvinyl acetal resin and the plasticizer are overlapped with the above description and thus the further description is omitted.

The film for bonding may be a film for bonding, whose section has a wedge shape in at least some portion, to have head up display functionality. The film for bonding may have a wedge shape, whose section has one end and the other end different in the thickness, and may have double image formation preventing performance.

The film for bonding may be manufactured to be a sheet shape by extruding a composition for manufacturing the film for bonding including a resin and a plasticizer, with an additive as needed and shaping the composition through a T-die or the like. When the film for bonding is a multilayer film, a laminating means like a feed block may be further applied to the front end of the T-die.

The film for bonding manufactured to be a sheet shape may be manufactured into a film for bonding through processes such as thickness control, embossment formation, and the like, but the manufacturing method for the film for bonding is not limited to such a method.

Figure 2:
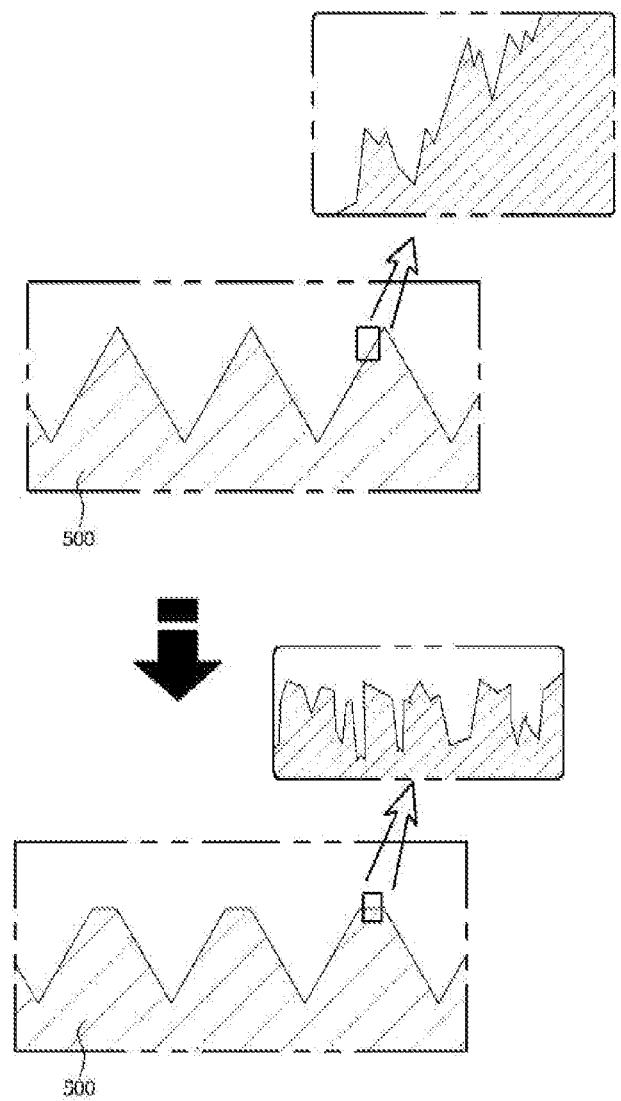
FIG. 2 and FIG. 3 are conceptual views for illustrating surface characteristics of an embossing roller used in the manufacturing process of the film for bonding of respective embodiments.
Figure 3:
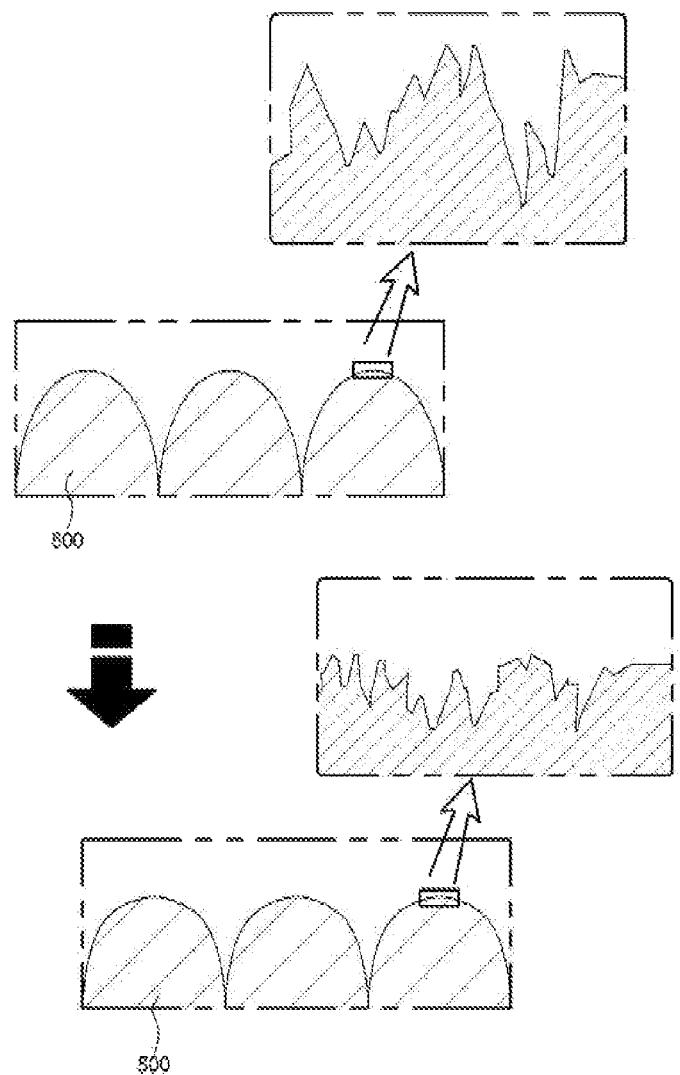
Figure 4:
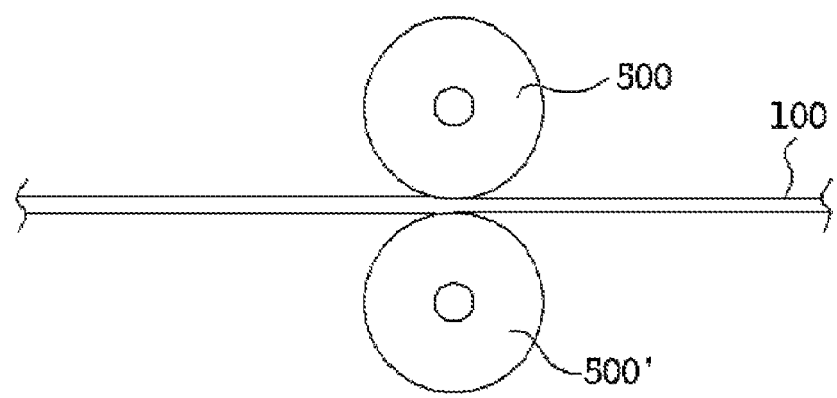
FIG. 4 is a conceptual view for illustrating a process of forming surface embossments in the manufacturing process of the film for bonding manufactured in one embodiment.

FIG. 1 is a conceptual view for illustrating an embossing roller used in the manufacturing process of the film for bonding of Comparative Example. FIG. 2 and FIG. 3 are conceptual views for illustrating surface characteristics of an embossing roller used in the manufacturing process of the film for bonding of respective embodiments of the present disclosure. FIG. 4 is a conceptual view for illustrating the process of forming surface embossments in the manufacturing process of the film for bonding according to one embodiment of the present disclosure. Hereinafter, with reference to FIGS. 1 to 4, the manufacturing method for the film for bonding having surface embossments of example embodiments of the present disclosure is described.

A single layer film or a multilayer film 100 is manufactured to be a sheet shape by the same method as described above, and after that, surface embossments of the film are formed by applying an embossing roller 500 and thereby the film for bonding is manufactured.

Surface characteristics of the embossing roller 500 is transferred to the surface of the single layer film 100 or the multilayer film 100 by applying a heat rolling press, which is ordinarily applied to a film for bonding. At this time, the transferring ratio may be 0.7 or more, 0.8 or more, or 0.99 or less. The transferring ratio is evaluated by a surface roughness of the corresponding surface of a film when the surface roughness of embossments is designated as 1.

Surface characteristics of the embossing roller 500 is complementarily transferred to the surface of the film 100, and therefore characteristic of the embossed surface of the film can be controlled by controlling surface characteristics of the embossing roller.

The embossing roller 500 may be manufactured by a method of grit blast treatment or the like to a basic roller (used in Comparative Example 1 below) as illustrated in FIG. 1. At this time, a condition applied during grit blast treatment (size of particles, injection pressure, injection distance, injection angle, and the like) may be adjusted to control surface characteristics, and these characteristics are complementarily reflected to characteristics of the film surface.

For example, particles having an average diameter of 3 to 8 μm are injected by direct air blast method at a distance of 20 to 30 cm, an injection pressure of 0.3 to 5 MPa and an angle of a nozzle to be 70 to 110 degrees to a basic roller having a Rz roughness value of 30 to 90 μm with pyramid shaped or half circle shaped protrusions. At this time, an embossing roller 500 is manufactured by applying grit blast treatment one to seven times. By using the embossing roller 500 to form surface embossments of a single layer film 100 or a multilayer film 100, the film for bonding of the present disclosure can be manufactured.

The light transmitting laminate according to another embodiment of the present disclosure includes a first light transmitting layer; a film for bonding disposed on one surface of the first light transmitting layer; and a second light transmitting layer disposed on the film for bonding.

The first light transmitting layer and the second light transmitting layer may be a light transmitting glass or a light transmitting plastic, respectively.

The film for bonding described above is applied as the film for bonding, the detailed description thereof is overlapped with the above description, and thus the further description is omitted.

The vehicle according to another embodiment of the present disclosure includes the light transmitting laminate described above. The vehicle includes a body forming a main body of the vehicle, a driving part (engine, etc.) attached to the body, a drive wheel attached to be rotatable to the body, a connector connecting the drive wheel and the driving part; and a windshield attached to a part of the body, which is the light transmitting laminate for blocking wind from outside.

Hereinafter, detailed embodiments will be described in further detail. However, the below examples are only just examples to aid understanding of the embodiments, and the scope of the present disclosure is not limited thereto. In below descriptions of experiments, when % is described without clear indication whether it is wt % or mol %, it refers to wt %.

Manufacturing Example: Manufacture of Embossing Roller

A surface of a roller having ordinary surface embossments was processed by grit blast treatment.

As illustrated in FIG. 1, a roller having protrusions in a pyramid shape (Rz=50 μm) was applied as ROLL1. As illustrated in an upper portion of FIG. 3, a roller having protrusions in a half circle shape (Rz=50 μm) was applied as ROLL2.

ROLL1_a was manufactured by grit blast treatment to the same roller as ROLL1 (refer to a lower portion of FIG. 2). The grit blast treatment was operated by injecting particles having an average outer diameter of 5 μm using a direct air blast method in an injection distance of 20 to 30 cm and an injection pressure of 0.4 MPa through an impurity removing filter with 150 mesh. The angle between a mold surface and injecting direction of particles (or a nozzle) was 70 to 110 degrees.

ROLL1_a was manufactured by operating the above grit blast treatment one time, and ROLL1_b was manufactured by operating the above grit blast treatment three times. And ROLL1_c was manufactured by operating the above grit blast treatment ten times.

ROLL2_a was manufactured by grit blast treatment to the same roller as ROLL2.

The rollers manufactured in this manner were used in Examples or Comparative Examples as indicated in below Table 1.

Manufacturing Example: Manufacture of Film

Respective ingredients used in below Examples and Comparative Examples are as follows.

Polyvinyl Butyral Resin (A): PVA and n-BAL having a polymerization degree of 1700 and a saponification degree of 99 were added, and a polyvinyl butyral resin having a hydroxyl group of 20.3 wt %, a butyral group of 78.9 wt %, and an acetyl group of 0.8 wt % was obtained by operating ordinary synthesizing process.

Preparation of Additive: Irganox1010 as an antioxidant of 0.1 parts by weight, TINUVIN-328 as a UV absorber of 0.2 parts by weight, Mg Acetate as an adhesion regulator of 0.03 parts by weight was blended and mixed to be sufficiently dispersed in a tumbler (The sum of 0.33 parts by weight).

Examples 1 to 4: a polyvinyl butyral resin (A) of 72.67 wt %, 3g8 as a plasticizer of 27 wt %, an additive of 0.33 wt % were put into a twin-screw extruder (a) to be extruded and manufactured into a film through a T-DIE. Before being winded, films, on which a surface embossment is transferred through embossing treatment by using different rollers (ROLL1_a, ROLL1_b, ROLL1_c, and ROLL2_a), respectively, as indicated in below Table 1 to an upper surface and a lower surface of the film, were prepared, and winding thereof to be a shape of a roll sample was performed to manufacture respective films of Examples 1 to 4. The manufactured film had a thickness of 760 μm and a width of 1.0 M.

Comparative Examples 1 and 2: Respective films of Comparative Example 1 and Comparative Example 2 were manufactured by the same method as above Examples 1 to 4 except that embossing treatment was operated on a upper surface and lower surface of films by using an embossing roller without grit blast processing (respectively, ROLL1 and ROLL2, with reference to below Table 1) on the surface of the embossing roller.

Evaluating Example: Evaluation of Properties

Measurement of SKu, Sk, Spk, and Svk

Sku, Sk, Spk, and Svk values were respectively measured through a 3D roughness measuring device according to ISO_25178. In detail, the 3D roughness was measured by using a non-contact type three-dimensional roughness measuring device (Contour GT model as a 3D Optical Microscopy) available from BRUKER in VSI Mode (Vertical Scanning Interferometry), and the above values were obtained.

The measurement was made by using a 2× ocular lens and a 5× objective lens. At this time, an area having a length of x axis of 0 to 0.887 mm and a length of y axis of 0 to 0.670 was scanned. The measurement was repeated five times by designating a measuring area randomly on the same surface of the film, and three measured values except for the highest value and the lowest value were averaged and thereby a measuring value was obtained.

DEAIRING Stability Evaluation: Pre-Lamination Stability

Manufactured samples of Examples and Comparative Examples (respectively 320 mm) were placed between circle shaped glass plates, set by using a vacuum ring, and after that, vacuumized by using a vacuum pump at room temperature and confirmed whether the vacuum degree was maintained, and thereby samples for evaluation were manufactured.

When evaluation was made by raising a temperature of the sample for evaluation by 10° C., if the vacuum degree was changed by 50 mmHg or more with melting a surface embossing of the sample, it was denoted as X, if the vacuum degree was changed by 40 mmHg or more and less than 50 mmHg, it was denoted as Δ, if the vacuum degree was changed by 20 mmHg or more and less than 40 mmHg, it was denoted as ○, and if the vacuum degree was changed by less than 20 mmHg, it was denoted as ⊚, thereby evaluating DEAIRING stability (stability of pre-lamination).

Edge Sealing Evaluation

Manufacture of Samples for Evaluation

Films of Examples and Comparative Examples were cut to have width*length of 1000*1000 mm and aging thereof was performed by keeping them for two days at 20° C. and 20 rh %. A sample was cut to have width*length of 300*300 mm in the center portion in a width direction of the film, and three samples were cut in a length direction by the same method.

The sample were pre-laminated between two sheets of plate glass with a thickness of 2.1 T (T=mm) and respective three samples for evaluation were manufactured by Examples and Comparative Examples.

The sample for evaluation had respective width and length of 300 mm and the total length of four edges of one sample was 1200 mm. Respective three samples were prepared, and the edge sealing was evaluated in total 12 m.

A pre-laminating process was performed by keeping at different temperatures of three divisions of respective 70° C., 85° C., and 100° C. after deairing using a vacuum ring for 5 minutes at 20° C.

Evaluation of Edge Sealing Degree

The samples for evaluation were evaluated by a naked eye, a case of perfect edge sealing without showing a pattern was evaluated as score 5, a case of good edge sealing degree with a blurry pattern checked by a naked eye was evaluated as score 4, a case of ordinary edge sealing degree with a pattern checked by a naked eye was evaluated as score 3, a case of bad edge sealing degree with a pattern checked by a naked eye was evaluated as score 2, and a case of bad edge sealing degree with a pattern checked strongly by a naked eye was evaluated as score 1.

When the sum of scores of three samples were 15 to 12, it was denoted as ⊚, when the sum of scores of three sample were 12 to 9, it was denoted as ○, when the sum of scores of three sample were 9 to 7, it was denoted as Δ, and when the sum of scores of three sample were less than 7, it was denoted as X.

The result of property evaluation was shown in below Table 2.

TABLE 1

|  | Used Roller | Sku (Roller Surface) | Transcription Ratio | Sku Film Surface | Sz(μm) Film Surface |
|---|---|---|---|---|---|
| Comparative Example 1 | ROLL1 | 7.62 | 0.8 | 6.1 | 59.7 |
| Example 1 | ROLL1_a | 4.81 | 0.83 | 3.99 | 61.4 |
| Example 2 | ROLL1_b | 4.3 | 0.85 | 3.65 | 60.5 |
| Example 3 | ROLL1_c | 3.28 | 0.9 | 2.95 | 53.3 |
| Comparative Example 2 | ROLL 2 | 5.91 | 0.92 | 5.44 | 63.8 |
| Example 4 | ROLL 2_a | 3.25 | 0.89 | 2.89 | 66.5 |

TABLE 2

|  | Sk(μm) | Spk(μm) | Svk(μm) | The Ratio of (Sk + Spk) when (Sk + Spk + Svk) is designated as 100% | De airing Stability | Edge sealing Performance |
|---|---|---|---|---|---|---|
| Comparative Example 1 | 24.5 | 18 | 18 | 70% | X | X |
| Example 1 | 22.8 | 16.2 | 18 | 68% | ○ | ○ |
| Example 2 | 17.9 | 13.3 | 20.1 | 61% | ◎ | ◎ |
| Example 3 | 8.9 | 5.7 | 16 | 48% | Δ | ◎ |
| Comparative Example 2 | 31.0 | 17.4 | 13.7 | 78% | Δ | Δ |
| Example 4 | 33.1 | 10.2 | 19.0 | 69% | ◎ | ◎ |

With reference to the Table 1 and Table 2, Comparative Example 1, whose Sku value was more than 5, had degraded properties of deairing stability and edge sealing performance so that it could be verified as not being suitable for a film for bonding. Example 3 having a ratio of Sk+Spk of less than 50% when a total Sk+Spk+Svk value was designated as 100%, had a Sku value of 5 or less, but showed a tendency of a deairing characteristic, which was slightly degraded. Cases showing the most excellent result was verified to be samples of Example 1, Example 2, and Example 4 whose Sku value was 3.5 or less, and a ratio of (Sk+Spk) was 55% or more when (Sk+Spk+Svk) was designated as 100%.

The film for bonding and the light transmitting laminate including the same of example embodiment can provide a film for bonding improved in degassing stability during formation of the light transmitting laminate, an edge sealing characteristic, and the like by controlling characteristics of the surface, where embossments are formed While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for bonding comprising an embossed surface, wherein the embossed surface has a Sku value of 5 or less, wherein the embossed surface has Sk, Spk, and Svk values, and when a total sum of the Sk value, the Spk value, and the Svk value is 100%, a sum of the Sk value and the Spk value is 50% or more, wherein the embossed surface has a Sz value of 30 to 90 μm, and wherein the film comprises a polyvinyl acetal resin and a plasticizer.

2. The film for bonding of claim 1, wherein the Sk value is 5 to 40 μm.

3. The film for bonding of claim 1, wherein the Sk value is 10 to 35 μm.

4. The film for bonding of claim 1, wherein the Sku value is less than 4.

5. The film for bonding of claim 1, wherein the Spk value is 2 to 25 μm.

6. The film for bonding of claim 1, wherein the film is a single layered film.

7. The film for bonding of claim 1, wherein the film is a laminated film with two or more layers.

8. The film for bonding of claim 1, wherein the embossed surface has a transferring ratio of 0.70 or more.

9. The film for bonding of claim 1, wherein a section of the film comprises a wedge shape in at least a portion of the section.

10. A light transmitting laminate comprising:
a first light transmitting layer;
a film for bonding disposed on one surface of the first light transmitting layer; and
a second light transmitting layer disposed on the film for bonding,
wherein the film for bonding comprises an embossed surface,
wherein the embossed surface has a Sku value of 5 or less,
wherein the embossed surface has Sk, Spk, and Svk values, and when a total sum of the Sk value, the Spk value, and the Svk value is 100%, a sum of the Sk value and the Spk value is 50% or more, wherein the embossed surface has a Sz value of 30 to 90 μm, and wherein the film comprises a polyvinyl acetal resin and a plasticizer.

11. The light transmitting laminate of claim 10, wherein the Sk value is 5 to 40 μm.

12. The light transmitting laminate of claim 10, wherein the Sk value is 10 to 35 μm.

13. The light transmitting laminate of claim 10, wherein the Sku value is less than 4.

14. The light transmitting laminate of claim 10, wherein the Spk value is 2 to 25 μm.

15. The light transmitting laminate of claim 10, wherein the film is a single layered film.

16. The light transmitting laminate of claim 10, wherein the film is a laminated film with two or more layers.

17. The light transmitting laminate of claim 10, wherein the embossed surface has a transferring ratio of 0.70 or more.

18. The light transmitting laminate of claim 10, wherein a section of the film comprises a wedge shape in at least a portion of the section.

19. A vehicle comprising a light transmitting laminate comprising:

a first light transmitting layer;

a film for bonding disposed on one surface of the first light transmitting layer; and a second light transmitting layer disposed on the film for bonding, wherein the film for bonding comprises an embossed surface, wherein the embossed surface has a Sku value of 5 or less, wherein the embossed surface has Sk, Spk, and Svk values, and when a total sum of the Sk value, the Spk value, and the Svk value is 100%, a sum of the Sk value and the Spk value is 50% or more, wherein the embossed surface has a Sz value of 30 to 90 μm, and wherein the film comprises a polyvinyl acetal resin and a plasticizer.

* * * * *